US009832769B2

(12) United States Patent
Guo

(10) Patent No.: US 9,832,769 B2
(45) Date of Patent: Nov. 28, 2017

(54) VIRTUAL FULL DUPLEX NETWORK COMMUNICATIONS

(71) Applicant: Northwestern University, Evanston, IL (US)

(72) Inventor: Dongning Guo, Chicago, IL (US)

(73) Assignee: Northwestern University, Evanston, IL (US)

( * ) Notice: Subject to any disclaimer, the term of this patent is extended or adjusted under 35 U.S.C. 154(b) by 0 days.

(21) Appl. No.: 14/509,667

(22) Filed: Oct. 8, 2014

(65) Prior Publication Data

US 2015/0023232 A1    Jan. 22, 2015

Related U.S. Application Data

(63) Continuation-in-part of application No. 12/924,391, filed on Sep. 27, 2010, now abandoned.

(60) Provisional application No. 61/372,449, filed on Aug. 10, 2010, provisional application No. 61/395,222, filed on May 10, 2010, provisional application No. 61/277,573, filed on Sep. 25, 2009.

(51) Int. Cl.
| | |
|---|---|
| *H04M 11/10* | (2006.01) |
| *H04J 3/16* | (2006.01) |
| *H04J 3/02* | (2006.01) |
| *H04W 72/04* | (2009.01) |
| *H04L 5/14* | (2006.01) |
| *H04W 72/12* | (2009.01) |
| *H04W 88/18* | (2009.01) |

(52) U.S. Cl.
CPC ....... *H04W 72/0446* (2013.01); *H04L 5/1469* (2013.01); *H04W 72/1257* (2013.01); *H04W 72/0466* (2013.01); *H04W 88/18* (2013.01)

(58) Field of Classification Search
CPC ........ H04W 72/0446; H04W 72/0466; H04W 72/1257; H04W 88/18; H04W 28/06; H04L 5/1469; H04L 65/4061; H04L 45/00; H04M 11/10; H04J 3/16
USPC ......................................... 370/280
See application file for complete search history.

(56) References Cited

U.S. PATENT DOCUMENTS

| | | | |
|---|---|---|---|
| 5,068,654 A | 11/1991 | Husher | |
| 5,751,763 A * | 5/1998 | Bruckert | ............... H04W 52/58 |
| | | | 370/342 |
| 6,483,828 B1 | 11/2002 | Balachandran et al. | |

(Continued)

FOREIGN PATENT DOCUMENTS

| | | |
|---|---|---|
| EP | 1465363 | 10/2004 |
| EP | 1566911 | 8/2005 |

(Continued)

OTHER PUBLICATIONS

Lei Zhang and Dongning Guo, Senior Member; IEEE, Virtual Full Duplex Wireless Broadcasting via Compressed Sensing, Oct. 17, 2013.*

(Continued)

*Primary Examiner* — Edan Orgad
*Assistant Examiner* — Vanneilian Lalchinthang
(74) *Attorney, Agent, or Firm* — Bell & Manning, LLC

(57) ABSTRACT

A half-duplex wireless network device is structured to transmit and receive information over a unique pattern of one or more transmission slots and one or more reception slots within each of a sequence of communication frames to accomplish virtual full-duplex communication.

20 Claims, 5 Drawing Sheets

(56) References Cited

U.S. PATENT DOCUMENTS

| | | |
|---|---|---|
| 6,804,191 B2 | 10/2004 | Richardson |
| 6,823,191 B2 | 11/2004 | Laroia et al. |
| 6,967,598 B2 | 11/2005 | Mills |
| 7,271,747 B2 | 9/2007 | Baraniuk et al. |
| 7,277,411 B2 * | 10/2007 | Shneyour ............... H04L 1/08 370/337 |
| 7,289,049 B1 | 10/2007 | Fudge et al. |
| 7,345,603 B1 | 3/2008 | Wood et al. |
| 7,436,911 B2 | 10/2008 | Fudge et al. |
| 7,436,912 B2 | 10/2008 | Fudge et al. |
| 7,457,319 B2 * | 11/2008 | Madapushi ............ H04L 47/10 370/278 |
| RE40,686 E | 3/2009 | Wood, Jr. |
| 7,511,643 B2 | 3/2009 | Baraniuk et al. |
| 7,551,681 B2 | 6/2009 | Chan et al. |
| 7,555,031 B2 | 6/2009 | Chan et al. |
| 7,600,179 B2 | 10/2009 | Asghar et al. |
| 7,653,003 B2 | 1/2010 | Stine |
| 7,680,202 B2 | 3/2010 | Chan et al. |
| 7,747,223 B2 | 6/2010 | Wilson et al. |
| 7,965,671 B2 | 6/2011 | Anderson et al. |
| 2003/0176195 A1 | 9/2003 | Dick et al. |
| 2003/0189893 A1 | 10/2003 | Richardson |
| 2004/0170121 A1 | 9/2004 | Kim et al. |
| 2004/0240401 A1 * | 12/2004 | Willenegger .......... H04B 7/264 370/294 |
| 2004/0261004 A1 | 12/2004 | Asghar et al. |
| 2005/0058116 A1 | 3/2005 | Palin et al. |
| 2005/0152329 A1 | 7/2005 | Krishnan et al. |
| 2005/0169463 A1 | 8/2005 | Ahn et al. |
| 2005/0185729 A1 | 8/2005 | Mills |
| 2005/0190784 A1 * | 9/2005 | Stine ...................... H04L 45/40 370/445 |
| 2006/0203795 A1 | 9/2006 | Welborn et al. |
| 2007/0027656 A1 | 2/2007 | Baraniuk et al. |
| 2007/0104248 A1 | 5/2007 | Chan et al. |
| 2007/0104249 A1 | 5/2007 | Chan et al. |
| 2007/0104285 A1 | 5/2007 | Chan et al. |
| 2007/0174726 A1 | 7/2007 | Nam et al. |
| 2007/0208986 A1 | 9/2007 | Luo et al. |
| 2007/0286136 A1 | 12/2007 | Rittle et al. |
| 2007/0288938 A1 * | 12/2007 | Zilavy .................. G06F 9/5061 719/327 |
| 2008/0037623 A1 | 2/2008 | Rjeily |
| 2008/0107013 A1 | 5/2008 | Boariu et al. |
| 2008/0129560 A1 | 6/2008 | Baraniuk et al. |
| 2008/0165797 A1 | 7/2008 | Aceves |
| 2008/0188259 A1 | 8/2008 | Blanz et al. |
| 2008/0242321 A1 | 10/2008 | Inoue et al. |
| 2008/0279125 A1 * | 11/2008 | Hottinen ............. H04B 7/2615 370/281 |
| 2008/0304551 A1 | 12/2008 | Li et al. |
| 2008/0309481 A1 | 12/2008 | Tanaka et al. |
| 2009/0040985 A1 | 2/2009 | Barnawi et al. |
| 2009/0040998 A1 | 2/2009 | Park |
| 2009/0082888 A1 | 3/2009 | Johansen |
| 2009/0116511 A1 * | 5/2009 | Anderson ............... H04L 45/00 370/468 |
| 2009/0180408 A1 * | 7/2009 | Graybeal ............. H04B 7/2615 370/281 |
| 2009/0191814 A1 | 7/2009 | Blu et al. |
| 2009/0222226 A1 | 9/2009 | Baraniuk et al. |
| 2009/0286482 A1 | 11/2009 | Gorokhov et al. |
| 2009/0286562 A1 | 11/2009 | Gorokhov |
| 2010/0079891 A1 | 4/2010 | Biskeborn et al. |
| 2010/0079896 A1 | 4/2010 | Biskeborn et al. |
| 2011/0134878 A1 | 6/2011 | Geiger et al. |

FOREIGN PATENT DOCUMENTS

| | | |
|---|---|---|
| EP | 1971034 | 9/2008 |
| WO | 0237693 | 5/2002 |
| WO | 03069826 | 8/2003 |
| WO | 03088540 | 10/2003 |
| WO | 2005074166 | 8/2005 |
| WO | 2007054767 | 5/2007 |
| WO | 2007092816 | 8/2007 |
| WO | 2008056233 | 5/2008 |
| WO | 2008086374 | 7/2008 |
| WO | 2008118168 | 10/2008 |
| WO | 2009035306 | 3/2009 |
| WO | 2009059279 | 5/2009 |
| WO | 2009077685 | 6/2009 |
| WO | 2009140633 | 11/2009 |
| WO | 2009140637 | 11/2009 |
| WO | 2010055171 | 5/2010 |

OTHER PUBLICATIONS

Lei Zhang and Dongning Guo, "Virtual Full Duplex Wireless Broadcasting via Compressed Sensing," IEEE/ACM Transactions on Networking, published Oct. 17, 2013.

Sabharwal, A; et al. "In-Band Full-Duplex Wireless: Challenges and Opportunities," IEEE Journal on Selected Areas in Communicatins, 2014, 32, pp. 1637-1652.

* cited by examiner

VIRTUAL FULL DUPLEX NETWORK COMMUNICATIONS

CROSS-REFERENCE TO RELATED APPLICATIONS

The present application is a continuation-in-part of U.S. patent application Ser. No. 12/924,391, filed Sep. 27, 2010, and claims the benefit of U.S. Provisional Patent Application No. 61/372,449, filed Aug. 10, 2010, U.S. Provisional Patent Application No. 61/395,222, filed May 10, 2010, and U.S. Provisional Patent Application No. 61/277,573, filed Sep. 25, 2009, the same are each incorporated herein by reference in their entirety.

GOVERNMENT RIGHTS

This invention was made with government support under Grant No. W911 NF-07-1-0028 awarded by the Army Research Office (managed under DARPA: IT-MANET Program) to the University of Texas, Austin, Northwestern University Subcontract Number UTA06-790/A2). The government has certain rights in the invention.

BACKGROUND

The present application relates to communication techniques, and more particularly, but not exclusively, relates to wireless network communications techniques involving virtual full-duplex techniques called rapid on-off-division duplexing (referred to herein as RODD). These techniques find application in Mobile ad hoc Networks (MANETs), nonmobile networks, and other communication systems.

In a typical wireless network, the half-duplex constraint mandates that a given wireless device cannot transmit and receive simultaneously over the same frequency band. In the Open System Interconnection (OSI) model, this constraint is typically intrinsic to implementation of one or more of the lower layers, such as the physical layer and/or the data link layer—typically involving the Media Access Control (MAC) sublayer of the data link layer.

There have been numerous works on the design of MAC protocols for wireless ad hoc networks. Typically, the collision model is assumed, where if multiple users simultaneously transmit to the same user, their transmissions are lost due to collision at the receiver. Thus, state-of-the-art designs either apply ALOHA-type of random access scheme or schedule users orthogonally ahead of transmissions, or use a mixture of random access and scheduling/reservation. However, random access leads to poor efficiency (e.g., ALOHA's efficiency is generally no more than about 30%), while scheduling users is often difficult and subject to the hidden terminal and exposed terminal problems. Moreover, the fundamental constraint of half-duplex is that a terminal can only listen to the channel during its non-transmission (or silence) time slots. For example, if several users each have data to broadcast to other users, existing schemes allow only one user to succeed at a time, because if two users broadcast simultaneously, they fail to receive data from each other. The usual approach to the half-duplex constraint is to define a time-division protocol which determines a priori, a schedule for separating transmission slots and listening slots. There have been studies of achieving full duplex communication using two radios or two radio frequencies, but such convenience comes at the expense of reduced spectral efficiency. Thus, there remains a demand for further contributions in this area of technology.

SUMMARY

One embodiment of the present application is directed to a unique communication technique. Other embodiments include unique methods, systems, devices, and apparatus involving wireless network communications. Further embodiments, forms, features, aspects, benefits, and advantages of the present application shall become apparent from the description and figures provided herewith.

BRIEF DESCRIPTION OF THE DRAWINGS

The description herein makes reference to the accompanying drawings wherein like reference numerals refer to like parts throughout the several views, and wherein.

DETAILED DESCRIPTION OF REPRESENTATIVE EMBODIMENTS

Figure 1:
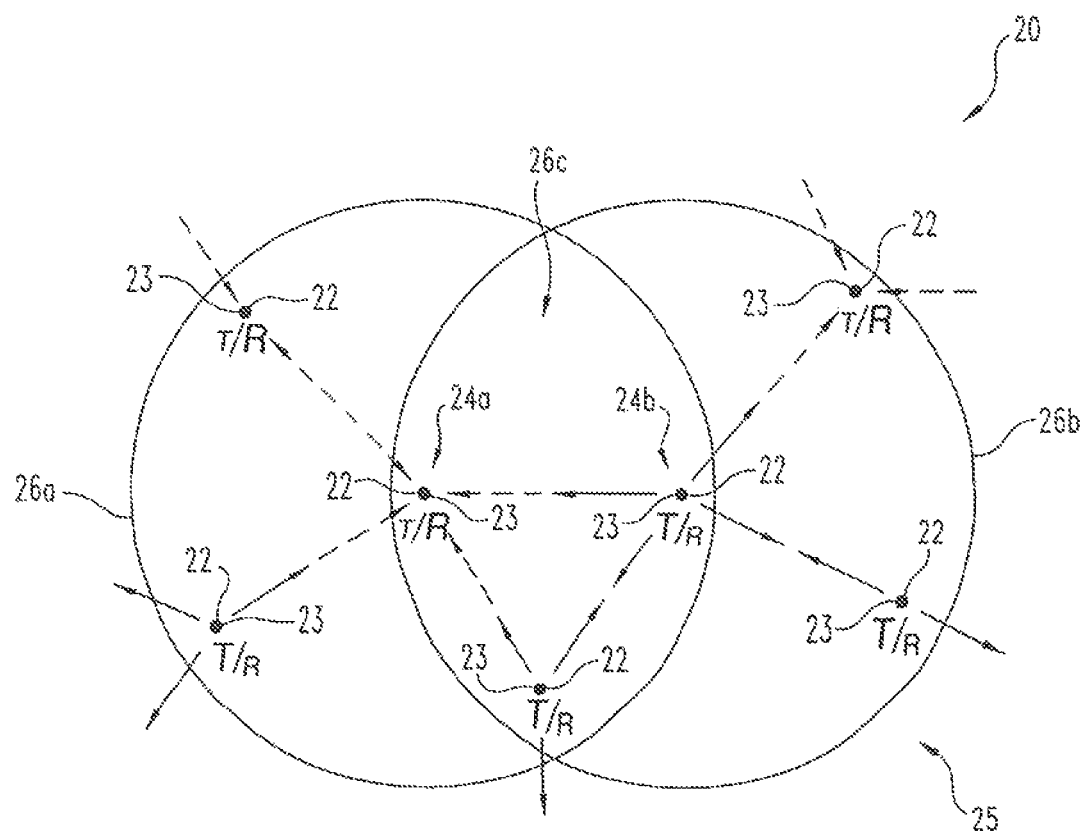
FIG. 1 is diagrammatic view of a system including a population of wireless communication devices operable to define an ad hoc communication network.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

In one embodiment of the present application, a new paradigm for designing the physical and medium access control (MAC) layers of wireless ad hoc networks is described. The design explicitly addresses the half-duplex constraint through a novel approach referred to as Rapid On-Off-Division Duplex ("RODD") that allows all nodes of the wireless network to transmit over every frame. Here, "frame" generally refers to a transmission unit or data packet, typically having a number of symbols of information intended to be conveyed as well as other "overhead" data so the intended receiver can recognize it as such. Typically, error control coding is applied to each frame separately. In this embodiment, each frame is partitioned into a number of slots and each nodal transmission is through a unique on-off mask, or signature, relative to those slots. The signature controls over which slots the user transmits a signal, where a slot could span one or several symbols. Each user, while transmitting over its transmission or "on" slots, receives signals over its own reception or "off" slots. Thus over the period of a single RODD frame, every user simultaneously broadcasts a message to all users in its neighborhood (and receives a message from every neighbor in the meantime). Contrary to standard schemes, transmission and reception switching occurs over slots, so that delay is minimized and overhead is significantly reduced; and "collision" is not avoided but embraced by taking advantage of the superposition nature of the multiaccess channel, so that throughput is maximized.

Preliminary results indicate that the throughput of this and other embodiments of the present application are greater than that of ALOHA-type random access, and more than twice as large in many cases. RODD also typically has advantages in the special case where each user has only a small amount of data to send, e.g., a few or tens of bits. In this case, the error-control coding overhead in RODD can be much less than that of usual networks designed based on the collision model.

FIG. 1 illustrates system 20 of another embodiment of the present application involving a multiple time slot communication technique during a given network frame. System 20 includes a number of wireless communication devices 22 distributed over an area of interest A. Devices 22 are structured to participate as a communication node 23 of a communication network 25 to be defined by system 20 as further described hereinafter. Devices 22 are spaced apart from each other and may be remote from one another. Typically, devices 22 represent only a subset of the total number of nodes 23 in communication with each other through an ad hoc network arrangement. Ad hoc networks generally refer to networks in which terminals or nodes are self-organized due to lack of existing infrastructure. Moreover, data communication between two nodes in the network often has to traverse multiple hops. Wireless ad hoc networks can play a significant role in emergency situations (such as locating victims of accidents or disasters), tracking objects/people, various other enterprise solutions, and battlefield/military applications; and further are also emerging as a desirable extension of future wide area networks. Devices 22 may communicate via any wireless signal type, such as Radio Frequency (RF), InfraRed (IR), acoustic signal waveform (sonic and/or ultrasonic), visible light, and/or other varieties known to those skilled in the art. In addition to wireless communication links/interfaces, some or all of devices 22 may be equipped with "wired" or cable-based communication links/interfaces. Devices 22 may be of any form or implementation, including without limitation, building and other environmental monitoring, disaster relief, emergency location of victims of an accident, military battlefield communications and logistics monitoring, cellular telephone communications, Personal Digital Assistant (PDA) networking, RFID tag applications, wireless computer networks, inventory tracking equipment, and/or other equipment or applications as would occur to those skilled in the art.

Figure 2:
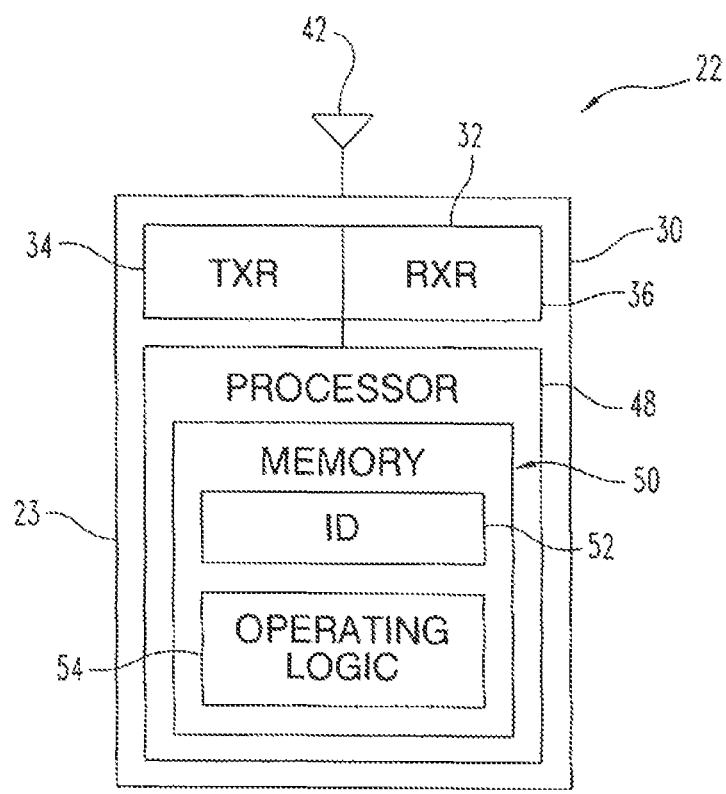
FIG. 2 is a schematic view of one of the devices of the system of FIG. 1.

Referring additionally to FIG. 2, further details of a representative device 22 are depicted. Device 22 includes a transmitter (TXR) 34 and a receiver (RXR) 36 integrated to define a transceiver 32. In other embodiments, transmitter 34 and receiver 36 may be separate from one another. Device 22 further includes a processing device 48 in operative communication with transceiver 32. Processing device 48 includes memory 50. Memory 50 stores a unique binary identifier (ID) 52 (alternatively designated a signature) that may be used to distinguish devices 22 from one another (as further described hereinafter). Furthermore, processing device 48 executes operating logic 54 to perform various routines with device 22, including those further described as follows.

Transceiver 32 sends communication signals to and receives communication signals from antenna 42, and communicates with processing device 48 to provide desired encoding of information/data in the signals, as might be desired for various applications of system 20. Processing device 48 includes appropriate signal conditioners to transmit and receive desired information (data), and correspondingly may include filters, amplifiers, limiters, modulators, demodulators, CODECs, signal format converters (such as analog-to-digital and digital-to-analog converters), clamps, power supplies, power converters, and the like as needed to perform various control, communication, and regulation operations described herein. Processing device 48 can be comprised of one or more components of any type suitable to process the signals received from transceiver 32 or elsewhere, and provide desired output signals. Such components may include digital circuitry, analog circuitry, or a combination of both. Processing device 48 can be of a programmable type; a dedicated, hardwired state machine; or a combination of these; and can further include multiple processors, Arithmetic-Logic Units (ALUs), Central Processing Units (CPUs), or the like. For forms of processing device 48 with multiple processing units, distributed, pipelined, and/or parallel processing can be utilized as appropriate. Processing device 48 may be dedicated to performance of just the operations described herein or may be utilized in one or more additional applications. In the depicted form, processing device 48 is of a programmable variety that executes algorithms and processes data in accordance with operating logic 54 as defined by programming instructions (such as software or firmware) stored in memory 50. Alternatively or additionally, operating logic 54 for processing device 48 is at least partially defined by hardwired logic or other hardware.

Memory 50 may be of one or more types, such as a solid-state variety, electromagnetic variety, optical variety, or a combination of these forms. Furthermore, memory 50 can be volatile, nonvolatile, or a mixture of these types, and some or all of memory 50 can be of a portable variety, such as a disk, tape, memory stick, cartridge, or the like. In addition to identifier 52, memory 50 can store data that is manipulated by the operating logic 54 of processing device 48, such as data representative of signals received from and/or sent to transceiver 32 in addition to or in lieu of storing programming instructions defining operating logic 54, just to name one example.

Referring back to FIG. 1, two particular nodes 23 are further designated as receiving device 24a and transmitting device 24b as a "snapshot" in time of network 25, where the arrows direct away from a node 23 indicate transmission and towards a node 23 indicate reception. Nodes 23 labeled with T/R are in a transmit mode and nodes 23 labeled with a R/T are in a receive mode for this particular snapshot. Further, the circles designated by 26a and 26b represent the wireless communication range of devices 24a and 24b, respectively. As used herein, "wireless communication range" refers to the nominal range over which wireless communications can occur directly between two wireless communication devices without being relayed or repeated through a third device spaced apart from either of the others. Accordingly, each circular region 26a and 26b defines a different network neighborhood each enclosing five nodes 23. The overlapping region designated by 26c encloses three nodes 23, including nodes 24a and 24b. Accordingly, nodes 23 in each of regions 26a and 26b, but outside of region 26c can communicate with each other through devices 24a and 24b, even if their respective communication ranges do not overlap.

Operating logic 54 of each device 22 cooperates to define an ad hoc network 25 with nodes 23. In network 25, a given node 23 may have a direct radio link with only a small number of nearby nodes 23, which are referred to as its "neighbors"—these neighbors being those nodes 23 (devices 22) within the communication range of the given node 23. In the absence of a central controller, it is desired that each node 23 discover and identify the network interface address of its neighboring nodes 23 before efficient routing or other higher-layer activities can take place as applicable. Among the routines by which nodes 23 define network 25 include those described in U.S. Provisional Patent Applications No. 61/277,573, filed on Sep. 25, 2009 and No. 61/372,449, filed Aug. 10, 2010 (previously incorporated by reference herein).

Operating logic 54 is further configured to permit all nodes 23 to transmit simultaneously and synchronously over every frame interval in a RODD model as further described hereinafter; where each nodal transmission is through a unique on-off mask (or signature), which is known to other nodes within its communication range. In a typically implementation, the signature of a user typically consists of many more off-slots (receiving) than on-slots (transmitting). The amount of information that a user can transmit during a frame may be proportional to the on-slots (or channel users) depending on the metrics of a given implementation. Each node 23, while transmitting over its on-slots, receives signal over its own off slots. Error control code is applied in each frame of transmission, so that user data can be recovered despite of erasures due to one's own transmission in the on-slots. Over the period of a single RODD frame, every node 23 or "user" simultaneously broadcasts a message to all users in its network neighborhood (and receives a message from every network neighbor in the meantime). As a novel physical/MAC-layer paradigm for ad hoc networks, the proposed wireless RODD departs from not only the collision model, but also the time-sharing scheme for dealing with the half-duplex constraint.

A deterministic function may be used to generate user (node 23) signatures from their network interface addresses, e.g., let the signature of a user be a (biased) pseudorandom sequence produced with the seed set to the other users within the radio range. The signature can be a random Bernoulli sequence, which can be generated as a random function of the user's network interface address (NIA). The function and the pseudorandom number generator could be distributed as a component of hardware/software. There is no need to distribute the entire set of signatures, because they can be enumerated by each user during network setup/neighbor discovery. Alternatively, the signature may be based on a second order Reed Muller code.

In one embodiment, the signatures of all nodal network neighbors are identified using the neighbor discovery techniques described in U.S. Provisional Patent Applications No. 61/277,573, filed on Sep. 25, 2009 and No. 61/372,449, filed Aug. 10, 2010 (previously incorporated by reference herein). Each user is assigned a unique on-off signature— corresponding to a unique pattern of one or more transmission time slots (on slots) and one or more reception time slots (off slots). Each user then determines, out of all users in the network, which ones are neighbors, based on the superposition of the on-off signatures it observes. In one form of this approach, one frame can be designated to neighbor discovery by requiring all users transmit their signatures, so that each user can run the RODD neighbor discovery process; where data transmission and neighbor discovery use the same type of signaling. In one embodiment, a demonstrative channel code for RODD is applicable to the case where the message from each user consists of a small number of bits, i.e., the number of possible messages is not large (e.g., up to several thousand possible messages). A user is then assigned a set of distinct on-off signatures, where each signature corresponds to one possible message. The user shall transmit the signature corresponding to its message. All signatures are known to all users. Compressed sensing techniques are applied by each user to identify, out of all possible messages (signatures) from all users, which messages were transmitted. See, e.g., Zhang, L.; Guo, D., "Virtual Full Duplex Wireless Broadcasting via Compressed Sensing," *IEEE/ACM Transactions on Networking*, doi: 10.1109/TNET.2013.2283793, published Oct. 17, 2013, which is incorporated by reference herein.

From every receiver's viewpoint, the channel for RODD is a multiaccess channel with erasure. Typical codes for multiaccess channels are generally suitable for RODD. Existing codes can achieve up to 70% of the capacity with manageable complexity. RODD is different from CDMA. In both RODD and direct sequence CDMA, nodes simultaneously transmit data bearing sequences. Their similarity ends there. In particular, their different timescales, access modes, and duplex schemes set them apart: 1) A CDMA spreading sequence spans over one symbol interval to carry one symbol, while an RODD sequence or signal spans over one frame interval to rep-resent one frame of data. Typically, frames are the units of error control coding; that is, all symbols in a given frame form a codeword, whereas different frames are coded separately. Thus, the RODD sequence is one codeword, whereas in CDMA, one codeword spans over many spreading sequences (often repetitions of the same sequence); 2) RODD is designed for many-to-many transmission, whereas CDMA is a many-to-one multiaccess scheme; 3) RODD signaling enables full-duplex communication at frame level, whereas CDMA is half-duplex in the absence of self-interference cancellation.

RODD is different from TDMA. Time-division multiple access (TDMA), which is suitable for many-to-one communication, is difficult to apply in many-to-many communication in a large network, where different nodes see different neighborhoods. In the scenario considered in this paper, every node in a large network wishes to broadcast its message to all neighbors, and also wishes to receive messages from all neighbors. To generate a time-division schedule for all nodes to avoid collision in every neighborhood that is throughput optimal is an NP-hard problem. Using ad hoc solutions leads to a highly conservative schedule with low throughput, whereas using a more aggressive schedule causes collisions and require complicated scheduling of retransmissions. Furthermore, a time-division schedule needs to be recomputed if a node moves in or out of a neighborhood, whereas the proposed RODD scheme is robust to network topology changes.

RODD is different from Random Access. The on-off signaling of RODD resembles that of ALOHA at a much faster timescale. There are, however, crucial differences. As frames are usually the units of error control coding, each frame (or a large on-slot) is coded separately in ALOHA or CSMA. In RODD, each frame consists of many (short) slots, so that we code over all the on-slots. From an individual node's viewpoint, other nodes' transmissions are seen as interference. If nodes use RODD signaling, the node experiences ergodic interference, whereas if nodes use random access schemes, the node experiences nonergodic interference. The former channel is ergodic because the interference fluctuates at slot level, but statistically the channel remains the same in every frame. The latter channel is nonergodic because the channel fluctuates at frame level and appears very different in different frames. The node may see no interference in some frames, but very high interference in other frames. When the channel is nonergodic, the node cannot predict the interference level, hence the node does not know the best data rate to transmit. If the node transmits at high rate, the frame may be lost when other nodes also transmit. If the node transmits at low rate, channel resources are wasted if no other nodes transmit at the same time. This problem is overcome by RODD signaling. Since the channels of all frames look statistically the same for a given node, all frames can be coded at the same rate up to the capacity of the channel and be decoded reliably by the receiving node. With random access, one could code over many frames to yield an ergodic channel. However, many frames would have to be received before decoding them, hence the decoding delay would be exceedingly large. For the same maximum decoding delay, random access achieves much lower rate compared to RODD.

Using various distributed algorithms for reaching consensus, it is not difficult to achieve synchronization in a small neighborhood. Let the slot be much larger than the propagation delay over the diameter of a neighborhood. To fully synchronize all users in the network, some absolute timing is supplied to each user, e.g., using GPS or some other infrastructure. Alternatively, a user can infer about the relative delay of other users, and then shift its timing such that its delay is the mean value of the delays of all users in its neighborhood, including itself. For ease of time acquisition, the signatures are designed to include cues so that timing can be recovered easily, even in the presence of other users with arbitrary time shifts.

In certain implementations, the largest gain of RODD is realized when several users each has data to broadcast to all other users. In this case, existing schemes allow only one user to succeed at a time, because if two users broadcast simultaneously, they fail to receive data from each other. The usual approach to the half-duplex constraint is to define a time-division protocol which determines a priori, a schedule for separating transmission slots and listening slots. The reason for the inferior performance of such schemes is largely due to the collision model assumption. Note that if multi-packet reception is allowed, the throughput improves. Such improvement, however, can always be matched by RODD by proper design of the signatures and proper design of the encoders and decoders. Moreover, in the case the goal is for each user to broadcast to all other users, there is essentially no improvement for random access schemes, such as ALOHA, because if two users simultaneously and successfully transmit their packets to all other users, they still have to exchange their messages.

Unlike the usual packet scheduling paradigm, which is in part an extension of wired network to the wireless medium, scheduling of transmissions under the half-duplex constraint need not be at the timescale of the frame level. In particular, if a user's transmission follows an on-off signaling mask over a sequence of sub-frame slots on approximately the same time-scale of a symbol interval, then the user can receive a useful signal during each off slot.

Referring in more detail to the RODD model of various embodiments of the present invention, FIG. 1 illustrates a snapshot of RODD taken at a slot, during which transceivers labeled with bigger "T" transmit, whereas transceivers labeled with bigger "R" do not and hence can receive. These and the operations that follow can be incorporated into the operating logic 54 of each of devices 22 (nodes 23 or users). Each user, while transmitting over its on slots (transmission time slots), receives signal over its own off slots (reception time slots). One way to view this is that the received signal of a user is erased during its own on-slots. Still, with sufficient redundancy in the transmissions, all user data can be recovered. Therefore, over the period of a single RODD frame, every user "simultaneously" broadcasts a message to all users in its neighborhood (and receives a message from every neighbor in the meantime).

Because users simultaneously transmit, the delay is typically smaller and more stable than in conventional reservation or scheduling schemes. Furthermore, the proposed scheme can have significant advantage in the special case where each user has only a small amount of data to send, e.g., a few or tens of bits, under tight delay constraint. In this case, the error-control coding overhead in RODD can be much less than that of usual networks designed based on the collision model. Generally, the total delay induced by the RODD technique is exactly one frame length, which is a constant, as opposed to a variable length depending on collision situation if some random access scheme is used.

It should be appreciated that on-off signaling over a slot which spans one or several symbols is easy to achieve because the response time of an RF circuit (in nanoseconds) is orders of magnitude smaller than the symbol interval (in microseconds). In fact, on-off signaling over sub-millisecond slots is a defining feature of TDMA in 2G cellular systems such as GSM. It is more challenging to maintain symbol-level synchronization so that the slots of all users in a neighborhood of the ad hoc network are aligned. It should be appreciated that local symbol-level synchronization can be achieved using consensus algorithms, which is typically amenable to small neighborhoods, because the propagation delay over the diameter of the neighborhood is still much smaller than the symbol interval.

It should be appreciated that for mobile communication systems used in an emergency situations, battlefields, and the like, the traffic is often broadcast from every mobile station to all others, in which case RODD is particularly efficient. Further, it should be noted that RODD can, if so desired, also play a limited role of a physical/MAC layer technique for exchanging state information amongst wireless terminals for purpose of resource allocation or scheduling.

One application of RODD is to assist distributed scheduling by letting each node choose whether to transmit based on its own state and the states of its neighbors. A simple distributed protocol leads to an efficient network-wide TDMA schedule. Another application is distributed interference management by exchanging interference prices.

Several basic aspects of the RODD model of the present application are next described. Consider a neighborhood with K users, indexed by 1, . . . , K, in an ad hoc network (such as network 25). Suppose all transmissions are over the same frequency band. Let time be slotted, where one or a few symbols can be transmitted over each slot, and suppose for now all users are perfectly synchronized. Let the binary on-off signature (mask) of user k be $s_k=[s_k1, \ldots, s_{kN}]$ over slots 1 through N. For each slot n, user k may transmit a symbol during the slot if $s_{kn}=1$, whereas if $s_{kn}=0$, the user does not transmit any energy during this slot, rather, it listens to the channel during this slot. Assume that the physical link between every pair of users is an additive white Gaussian noise channel with the same (instantaneous) channel gain equal to $\gamma$. The received signal of user k during slot i is then described by:

$$Y_{ki} = (1 - s_{ki})\sqrt{\gamma} \sum_{j \neq k} h_{kj} s_{ji} X_{ji} + W_{ki}, \quad (1)$$

$$i = 1, \ldots, N$$

where $h_{kj}$ denotes the channel coefficient, $X_{ji}$ denotes the transmitted symbol of user j at time slot i, and $W_{ki}$ denote additive noise. Clearly, if user k transmits during slot i (i.e., $S_{ki}=1$), then its received signal during the slot can be viewed as an erasure. It is also assumed that the signaling of each user is subject to unit average power constraint, i.e.: $\Sigma_{i=1}^N s_{ki} x_{ki}^2 \leq N$ for $k=1, \ldots, K$.

Consider information exchange among K users in a neighborhood. Suppose each user has a message to broadcast to all other K-1 users over N slots. An N-slot block is regarded as being successful if the message from every user is decoded correctly by all other users; otherwise the block is in error. A rate tuple for the K users is achievable if there exists a code which the users can transmit at their respective rates with vanishing error probability in the limit of $N \to \infty$. In case all messages are of the same number of bits, the rate tuple collapses to a single number, where the maximum achievable such rate is the symmetric capacity.

Before data communication can take place, a user needs to acquire the identities or network interface addresses of its neighbors. This is frequently referred to as neighbor discovery. Typically neighbor discovery is carried out over a given period of time, where users each transmit a distinct signal to announce its own identity. In conventional neighbor discovery schemes based on random access, each user transmits its identity many times with random delay, so that every user is able to identify every neighbor at least once without collision. It is not difficult to see that the linear multiaccess channel model (1) also applies to the neighbor discover problem if we replace $X_{ji}$ by $B_j$ for all $i=1, \ldots, N$, where $B_j=1$ if user j is present in the neighborhood, and $B_j=0$ otherwise. The signal each user k transmits over the entire discovery period to identify itself is then the signature $s_k$. The goal here is to identify which $B_j$'s are 1. It should be appreciated that to identify a small number of neighbors out of a large collection of users based on the signal received over a linear channel is fundamentally a compressed sensing problem, for which a small number of measurements (channel users) suffice.

In U.S. Provisional Patent Application No. 61/277,573, filed Sep. 25, 2009, and No. 61/372,449, filed Aug. 10, 2010 (previously incorporated by reference herein), techniques have been proposed, in which each user is assigned a unique signature of on-off signaling. Each user then determines, out of all users in the network, which ones are neighbors, based on the superposition of the on-off signatures it observes. This approach can be implemented using the method of elimination (or group testing), which is much faster than most other compressed sensing algorithms in this case. It should be observed that from one user's viewpoint, for each slot with (essentially) no energy received, all users who would have transmitted a pulse during that slot cannot be a neighbor; the surviving users are the regarded as neighbors. (In case of noisy environment, more conservative elimination of a node as a non-neighbor can be carried out by requiring multiple measurements (or slots) to point to its elimination.) This RODD neighbor discovery process requires only noncoherent energy detection and has been shown to be effective and efficient at moderate SNRs; moreover, it requires many fewer symbol transmissions than standard neighbor discovery schemes. In another embodiment, the signatures are not necessarily superimposed when a second order Reed-Muller code is used to form the signatures.

Figure 3:
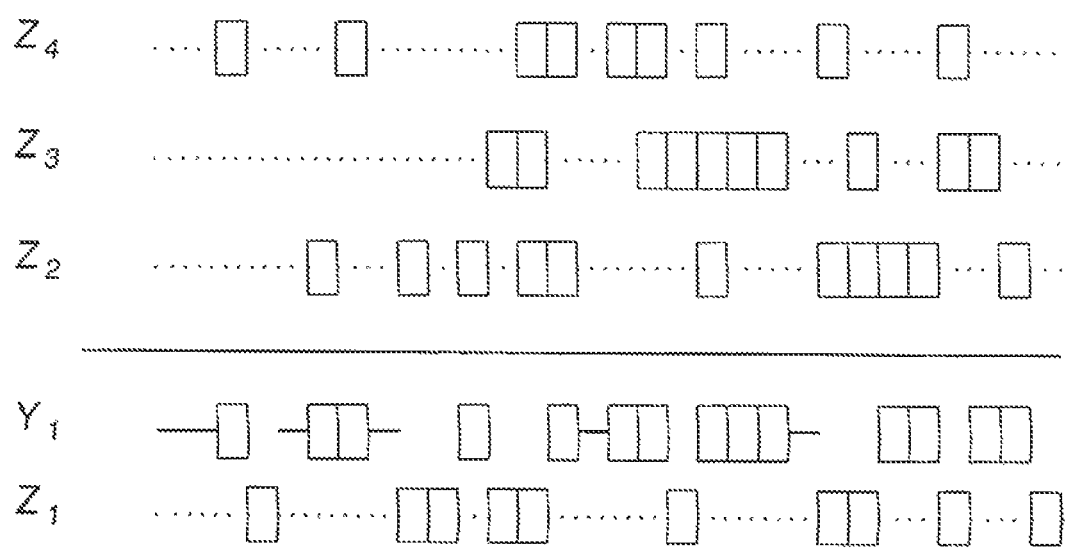
FIG. 3 is a plot of RODD signaling with respect to time.

A result for the capacity of RODD over a (simplified) deterministic model for multiaccess channels is next presented: Let the signal $X_{ji}$, take values from $\{0, 1\}$. Then the received signal is:

$$Y_{ki} = \bigvee_{j \neq k} (s_{ji} X_{ji}) \qquad (2)$$

for every $i=1, \ldots, N$ with $s_{ki}=0$, which describes an "inclusive or" multiaccess channel (referred to as OR-channel). An example illustration of the signaling is depicted in FIG. 3. Here $Z_1, \ldots, Z_4$ represents the transmitted signals of user 1 through user 4, i.e., $Z_{ji}=s_{ji} X_{ji}$ for all I, j. The dotted lines represent non-transmissions. The received signal of user 1 is $Y_1$, which is the outcome of the OR operation of $Z_1$, $Z_2$, $Z_3$. Note that the received signal $Y_1$ of user 1 is valid only during non-transmission slots of user 1. In fact the deterministic model can be regarded as a simplification of the Gaussian multiaccess channel with non-coherent transmission and simple energy detection, so that as long as some terminals transmit energy ("1") during slot i, the receiver decides there is energy ($Y_{ki}=1$), whereas if no terminal transmits any energy (all send "0") during slot i, the receiver decides there is no energy ($Y_{ki}=0$). The model captures the multiaccess nature of the channel, while ignoring the effect of noise, although noise can also be easily included.

As to throughput evaluation, consider the OR-channel described by (2). Suppose the elements skn of the signatures are i.i.d. Bernoulli random variables with $P(s_{kn}=1)=q$. Assume every node has complete knowledge of the signatures of all users. Also assume that the codebook of each user is designed independent of the signatures except for the parameters (q, K). A user's codeword is basically punctured by its own signature mask before transmission. Preliminary Result 1: the symmetric capacity of the OR-channel (2) is:

$$C = \max_{p \in [0,1]} \frac{1}{K-1} \sum_{m=0}^{K-1} \binom{K-1}{m} q^m (1-q)^{K-m} H_2((1-p)^m) \qquad (3)$$

where $H_2(p)=-p \log p-(1-p) \log(1-p)$ is the binary entropy function. The symmetric capacity is achieved by random codebook with i.i.d. Bernoulli (p) entries. To see this result, consider the slots over which m users transmit while the remaining K-m of them listen. The achievable rate is given by the mutual information between the binary received signal Y and the transmitted symbols Z in a given slot:

$$I(Z,Y)=H(Y)-H(Y|Z)=H(Y)-H_2((1-p)^m) \qquad (4)$$

where the second equality is due to the deterministic nature of the model.

FIG. 3 illustrates the RODD signals of four nodes over 30 slots in a frame, where symbol-level synchronous transmission is assumed for simplicity. Here, $Z_1, \ldots, Z_4$ represent the transmitted signals of node 1 through node 4, respectively, where the dotted lines represent off-slots and rectangles represent on-slots. The received signal of node 1 through its own off-slots is $Y_1$, which is the superposition of $Z_1, Z_2$, and $Z_3$ with erasures (blanks in FIG. 3) at the on-slots of node 1. If no node transmits at a slot then node 1 receives zero signal represented by a solid line. With sufficient redundancy in each frame, all desired data in $Z_2, Z_3, Z_4$ can be recovered from $Y_1$. Therefore, over the period of a single RODD frame, every node can "simultaneously" broadcast a message to its neighbors and receive a message from every neighbor at the same time.

Figure 4:
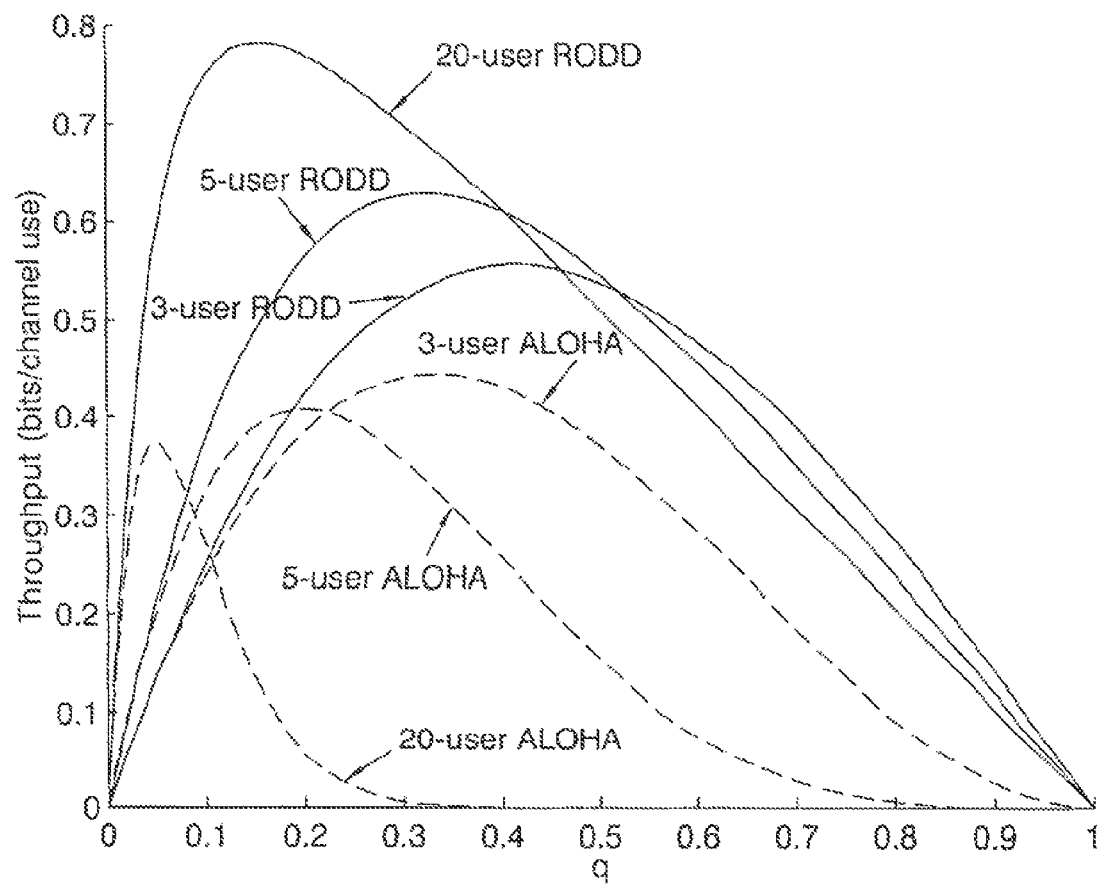
FIG. 4 is a graphical comparison of the throughput of RODD and ALOHA over an OR-channel.
Figure 5:
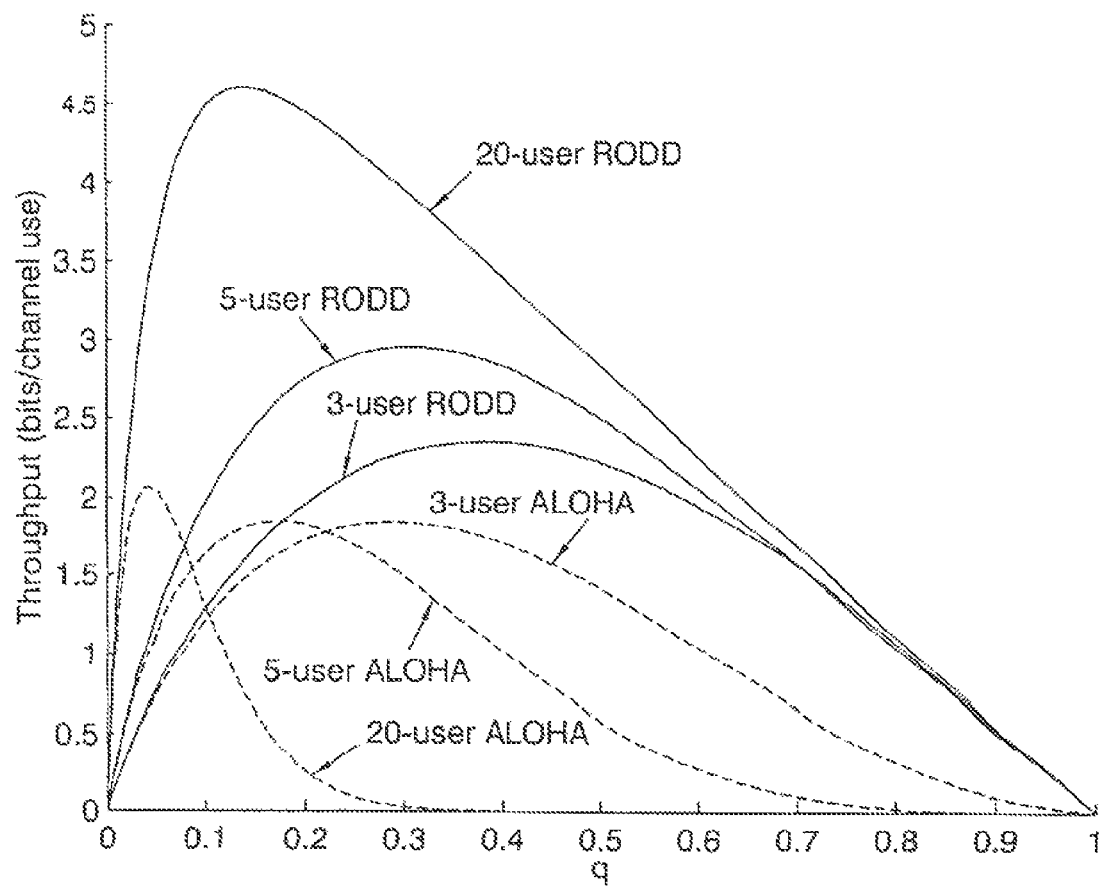
FIG. 5 is a graphical comparison of the throughput of RODD and ALOHA over a Gaussian Channel.

Preliminary results for a Gaussian Multiaccess Channel are next considered FIG. 4 comparatively plots RODD and ALOHA over a Gaussian channel for different user populations. Consider now a (non-fading) Gaussian multiaccess channel described by (1), where $h_{kj}=1$ for all k; j, and $\{W_{ji}\}$ are i.i.d. Gaussian random variables. For simplicity, let all users be of the same SNR. Let the average power of each transmitted codeword be 1. Since each user only transmits over about qN slots, the average SNR during each active slot is essentially $\gamma/q$. It is easy to see that the throughput of ALOHA over the Gaussian channel is $Kq(1-q)^{K-1}g(\gamma/q)$, where $g(x)=(\frac{1}{2})\log(1+x)$. Similar to the results for the deterministic model, the capacity for the Gaussian multi-access channel is achieved by Gaussian codebooks and admits a similar format. Preliminary Result 2: The symmetric capacity of the non-fading Gaussian multi-access channel described by (1) is $$C = \frac{1}{K-1}\sum_{m=0}^{K-1}\binom{K-1}{m}q^m(1-q)^{K-m}g\left(\frac{m\gamma}{q}\right). \quad (5)$$

Again, as is shown in FIG. 4, the symmetric capacity of RODD given by (5) is greater than that of ALOHA for all number of users and every value of q. In many applications, the amount of data different users transmit/broadcast can be very different. In random access schemes, users with more data will contend for more resources. In certain embodiments, a corresponding protocol for RODD is designed where the data rate, transmit power and modulation format of each user is adapted to the amount of data to be transmitted. Because the amount of information each user receives is typically several times the amount of information it transmits, the signature of a user usually consists of many more off-slots than on-slots, i.e., it is somewhat sparse. The amount of information that a user can transmit during a frame may be proportional to the on-slots (or channel users).

Based on preceding descriptions, a typically effective way to assign on-off signatures (that is a unique transmit-receive slot pattern) is to produce a set of random i.i.d. Bernoulli sequences. In certain embodiments, a deterministic function h(●) of user network interface address is used as the signature, e.g., let the signature be a (biased) pseudorandom sequence produced with the seed set to the NIA—in which case there is then no need to distribute the set of signatures, except for the pseudorandom number generator.

Using the function h(●), each user can produce a list of all K possible signatures in the network: h(0), h(1), h(2), . . . . The neighbor discovery schemes previously described in connection with U.S. Provisional Patent Applications No. 61/277,573, filed Sep. 25, 2009, and No. 61/372,449, filed Aug. 10, 2010 (previously incorporated by reference herein) can be used. For example, one frame can be designated to neighbor discovery by requiring all users to transmit their signatures, so that each user can run the compressed neighbor discovery algorithm. Data transmission and neighbor discovery share the same linear channel model. In fact, if the signaling for the data frame is such that a user always transmits energy over an on-slot, then neighbor discovery can be carried out solely based on a frame of data transmission.

The scaling and efficiency of compressed sensing techniques generally suggest that group testing is feasible for up to about one million users (20-bit NIA), but becomes too slow for larger systems. As proposed in U.S. Provisional Patent Applications No. 61/277,573, filed Sep. 25, 2009, and No. 61/372,449, filed Aug. 10, 2010 (previously incorporated by reference herein), in certain embodiments with larger numbers of users, the n-bit signature can be divided to two N/2-bit signatures for separate identification, because for long signatures, the problem is still RODD neighbor discovery when half of the observations are made. In this case, group testing for each half of the observations identifies half of the NIA, which are bin numbers, based on which the full NIA and the signature can be recovered.

In one embodiment, deterministic signatures based on second-order Reed-Muller codes are used as the number of nodes grows larger. One advantage of such signatures is that the corresponding chirp decoding algorithm has sub-linear complexity, which allows practical, efficient discovery even if the NIA space is $10^{30}$ or larger.

Further considering channel coding for certain RODD embodiments of the present application, a channel code is considered that does not achieve the capacity but is simple and useful when the message is short. Consider a problem frequently seen in practice: each user in a neighborhood wishes to broadcast a few bits to all other users. The short message can be information about the local state of the user, such as the channel quality, the queue length, the code and modulation format, a request for some common resource, etc. A coding scheme can be prepared for which decoding is essentially via compressed sensing. Consider the simplest case, where each user has one bit to broadcast to all other users. Let each user k be assigned two on-off signatures, $s_{k,0}$ and $s_{k,1}$, where user k transmits $s_{k,1}$ to send message "1" whereas user k transmits $s_{k,0}$ to send message "0." All users transmit their signatures simultaneously, and listen to the channel through their respective off-slots. This approach is similar to the neighbor discovery problem, except that each user tries to identify which signature from each neighbor was transmitted so as to recover 1 bit of information from the user.

The preceding coding scheme can be easily extended to the case where the message $m_k$ from user k is chosen from a small set of messages $\{1, \ldots, M\}$. In this case, user k is assigned M distinct on-off signatures, and transmits the signature corresponding to its message. All signatures are known to all users. The problem is now for each user to identify, out of a total of MK messages (signatures) from all users, which K messages (signatures) were selected. For example, in the case of 5 users each with a message of 10 bits, the problem is to identify 5 out of $5 \times 2^{10} = 5120$ signatures. This is essentially a compressed sensing problem, for which a rich set of efficient and effective decoding algorithms can be used to solve it. Consider the deterministic OR-channel, where the observation of user k through all of its off-slots can be regarded as a vector signal $Y_k = V_{j\neq k}s_{j,m_j}$ corresponds to message $m_j$ from user j, and the "or" operation for vectors is element-wise. To determine which signatures constitute the observation $Y_k$ is again a group testing problem. The only possible type of error is false alarm, and the larger the number of tests, the smaller the error probability. Comparing the compressed sensing code with ALOHA in terms of achieving the same error probability $\epsilon=0.003$, it should be appreciated that in ALOHA, an error event occurs when at least one user has not been able to transmit its message without collision within given number of contention periods. Consider a neighborhood of K=5 users each with a message of 15 bits ($M=2^{15}$). If the compressed sensing code is used, $4K\log(MK/\epsilon) \approx 357$ channel uses suffice. For ALOHA, the smallest number of contention periods that achieves the same error probability is 68 (with q=0.2), which corresponds to $68 \times 15 = 1020$ channel uses. Clearly, the compressed sensing based codes outperforms ALOHA by a factor of 3 in terms of code rate.

From every receiver's viewpoint, the channel for RODD is a multiaccess channel with erasures. All codes suitable for multiaccess channels are generally suitable for RODD. Coding schemes for the OR multiaccess channel have been identified, such as certain nonlinear trellis codes that achieves about 60% of the sum-capacity. Gaussian codebooks achieve the capacity. In practice, however, QAM or PSK signaling is often used depending on the SNR. It should be appreciated that trellis-coded multiple access can be particularly suitable for higher constellations.

Considering synchronization in ad hoc networks, with the use of various distributed algorithms for reaching consensus, it is not difficult to achieve synchronization in a small neighborhood. It should be appreciated that if the slot is much larger than the propagation delay over the diameter of a neighborhood, one may simply use some pilot or beacon signal to achieve synchronism. (For example, with 10K slots per second, the slot interval at 100 microseconds, which is 100 times the propagation delay over a 300-meter neighborhood.) To fully synchronize all users in the network requires some form of absolute timing, e.g., through GPS or some other type of infrastructure. However, for the problem at hand, local synchronization is sufficient, namely, it succeeds if all transmissions in a given neighborhood are approximately aligned. Given that the observation of each user is through its off-slots (reception time slots), the user's observation of other user's signals (and timings) is only partial. The user can infer about the delay of other users, and then shift its timing such that its delay is the mean value of the delays of all users in its neighborhood, including itself. The synchronization problem is fundamentally a filtering problem of a hidden Markov process, which suggest that over time the delays converge to synchronized transmission in each local area. The accuracy is still limited by two factors: the channel impairments and the propagation delay. Also, over the entire network there is still the possibility of fluctuation of the relative delay, but the delay of all users is typically a smooth function geographically.

It should be understood that synchronization is not a necessary condition for various RODD embodiments of the present application to function. In particular, whether the network is synchronized or not, each user observes essentially the same amount (in time) of signals through its own off-slots. Suppose for now that a receiver knows the relative delay of every user in the neighborhood, then decoding asynchronous signals is in principle a multiuser detection/decoding problem. For ease of time acquisition, the RODD protocol can be designed in certain embodiments such that the signatures include cues so that timing can be recovered easily, even in presence of other users with arbitrary time shifts.

Indeed, the embodiments of the present application lead to transformative design of the physical and MAC layers of such networks, with significantly improved performance in many instances, while being robust with respect to wide variations in interference and channel conditions.

In another embodiment, deterministic signatures based on second-order Reed-Muller (RM) codes are used to overcome the scalability problem. One advantage of such signatures is that the corresponding chirp decoding algorithm has sublinear complexity, which allows practical, efficient discovery even if the NIA space is $10^{30}$ or larger. RM signatures form excellent measurement matrices which satisfy the restricted isometry property (RIP) statistically. Due to their group structure, the decoding complexity is sublinear in N and feasible for networks of any practical size, e.g., with M=1, 024, decoding is viable for a network of $N=2^{65}$ distinct signatures.

The construction of the signatures can be briefly described as follows. Given a positive integer m, construct the Kerdock set K(m) consisting of $2^m$ binary symmetric m×m matrices. Generally, the matrices may be considered binary Hankel matrices where the top row consists of arbitrary entries and each of the remaining reverse diagonals is computed from a fixed linear combination of the entries in the top row. It is known that K(m) is a m-dimensional vector space with basis $\{P(\epsilon_m^i)\}_{i=1}^m$, where $P(\epsilon_m^i)$ corresponds to the m×m matrix in which all but the i-th entry in the top row are 0 and the i-th entry is set to 1. For any l≤m, matrix P∈k(l) can be padded to
an m×m symmetric matrix represented by P(P), where the lower left l×l submatrix is P and other entries are all zeros if any. Putting together all padded bases $\{P(P(\epsilon_m^i))\}_{i=1}^m$, $\{P(P(\epsilon_{m-1}^i))\}_{i=1}^{m-1}$, ..., $\{P(P(\epsilon l))\}$ forms a new set B, which can be regarded as basis of the m(m+1)/2-dimensional vector space formed by all m×m symmetric matrices. Given n≤m(m+1)/2, any $c=(c_1, \ldots, c_n)^T \in \mathbb{Z}_2^n$ corresponds to an m×m symmetric matrix represented by $P(c)=\Sigma_{i=1}^n c_i P(B(i))$ mod 2, where B(i) is the i-th element in the set B.

Each node can then map its NIA into a signature as follows. Let the NIA consists of n+m bits, which is divided into two binary vectors: $b \in \mathbb{Z}_2^m$ and $c \in \mathbb{Z}_2^n$, with n≤m(m+1)/2. The corresponding signature is of $2^m$ symbols, whose entry indexed by each is given by $a \in \mathbb{Z}_2^m$ is given by $$\phi_{P(c),b}(a) = \exp\left[j\pi\left(\frac{1}{2}a^T P(c)a + b^T a\right)\right]. \quad (6)$$

The system can thus accommodate up to $2^{m(m+3)/2}$ nodes with distinct signatures, each of length $2^m$. For example, if m=10, then there will be up to $2^{65}$ signatures of length $2^{10}$=1,024. The chirp reconstruction algorithm can be applied for a query node to recover its neighborhood based on the observations. The general idea of the iterative algorithm is as follows: 1) initialize the residual signal to Y, 2) take the Hadamard transform of the auto-correlation function of Y to expose the coefficient of the digital chirps, 3) extract the Kerdock matrix $P(\epsilon_j)$ corresponding to the largest energy component in the residual signal and determine the corresponding $X_j$, and 4) update the residual signal and repeat steps 2 to 4 until the residual falls below a threshold. The query node has thus acquired the signatures of all peers with high probability. The signatures can also be used to recover the NIAs if needed.

Unfortunately, the RM signatures consist of QPSK symbols, which do not allow a node to transmit and measure the channel at the same time, thus prohibiting full-duplex discovery. To overcome the lack of full-duplex discovery, RM signatures are converted to on-off signals by introducing 50% erasures, so that each node emits energy over half of its slots, and make measurements over the remaining half. This allows neighbors to observe about 25% of each others' on-slots (this is the maximum). Numerical results indicate that reliable half-duplex discovery is achievable for a network of $2^{20}$ nodes, where the neighborhood size is on average 50, at SNRs well below 10 dB, using signatures of merely 1,024 symbols. Moreover, the performance degrades with up to 25% erasures, which can be compensated for by proportionally longer signatures.

The present application has several features. For example, RODD enables (virtual) full-duplex transmission using half-duplex radios, which generally simplifies the design of higher-layer protocols. The throughput of RODD-based schemes substantially exceeds that of random access schemes. RODD signaling takes advantage of the superposition and broadcast nature of the wireless medium and is particularly suitable for advanced transmission techniques, such as cooperative relaying and network coding. RODD-based technology is generally most efficient when the traffic is broadcast from every node to all its neighbors, such as in mobile systems used in spontaneous social networks, emergency situations, or on battlefield. Communication overhead is generally an afterthought in network design; however RODD enables efficient exchange of a small amount of state information amongst neighbors based on sparse recovery (i.e., compressed sensing). Because nodes may simultaneously transmit, the channel-access delay is typically smaller and more stable than in conventional reservation or scheduling schemes.

Any experimental (including simulation) results are exemplary only and are not intended to restrict any inventive aspects of the present application. Any theory, mechanism of operation, proof, or finding stated herein is meant to further enhance understanding of the present application and is not intended to make the present application in any way dependent upon such theory, mechanism of operation, proof, or finding. Simulations of the type set forth herein are recognized by those skilled in the art to demonstrate that methods, systems, apparatus, and devices, are suitable for their intended purpose. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow. In reading the claims it is intended that when words such as "a," "an," "at least one," "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary. While the invention has been illustrated and described in detail in the drawings and foregoing description, the same is to be considered as illustrative and not restrictive in character, it being understood that only the selected embodiments have been shown and described and that all changes, modifications and equivalents that come within the spirit of the invention as defined herein or by any claims that follow are desired to be protected.

What is claimed is:

1. A method in a network of distributed wireless communication devices, comprising:
    providing virtual full-duplex wireless communication, where the virtual full-duplex wireless communication includes:
    receiving, by a first half-duplex wireless communication device, a symbol of information from a second wireless communication device, the receiving occurring during a transmission of a data packet by the first half-duplex wireless communication device, the data packet being partitioned to include a reception slot to receive the symbol of information during transmission of the data packet; and
    receiving, by the first half-duplex wireless communication device, a symbol of information from a third wireless communication device during another reception slot of the data packet being transmitted by the first half-duplex wireless communication device.

2. The method of claim 1, further comprising designating a unique pattern of transmission slots and reception slots for the first half-duplex wireless communication device, the data packet being partitioned to include the transmission slots and the reception slots.

3. The method of claim 2, further comprising applying an error control code for the data packet.

4. The method of claim 2, where the designating comprises performing a compressed sensing process.

5. The method of claim 2, wherein each unique pattern is based on a second order Reed-Muller code.

6. The method of claim 2, where the data packet provides full-duplex transmission using half-duplex radios.

7. A method in a network of distributed wireless communication devices, comprising:
    providing virtual full-duplex wireless communication, where the virtual full-duplex wireless communication includes:
    transmitting, by a first wireless communication device and a second wireless communication device, a first and a second information to a third half-duplex wireless communication device; and
    simultaneously sending, by the third half-duplex wireless communication device, symbols of information in a data packet to the first wireless communication device while receiving the first and second information from the first wireless communication device and the second wireless communication device, the symbols of information being sent during transmission slots of the data packet and the first and second information being received during reception slots of the data packet.

8. The method of claim 7, further comprising designating a unique pattern of transmission slots and reception slots for the first wireless communication device, the second wireless communication device and the third half-duplex wireless communication device.

9. The method of claim 8, wherein the designating comprises performing a compressed sensing process.

10. The method of claim 8, wherein each unique pattern is based on a second order Reed-Muller code.

11. The method of claim 7, further comprising applying an error control code to the data packets.

12. The method of claim 11, where the error control code provides for recovering the first and second information despite erasures due to transmission of the symbols of information.

13. The method of claim 7, where the transmission slots and the reception slots provide virtual full-duplex transmission using half-duplex radios.

14. The method of claim 7, further comprising the third half-duplex communication device emitting energy over the transmission slots and measuring energy over the reception slots.

15. The method of claim 7, where intervals for the transmission slots and the reception slots comprise on an order of microseconds.

16. A wireless communication device operable to wirelessly communicate with one or more other devices through a wireless network, comprising:
    a half-duplex radio configured to provide a virtual full-duplex wireless communication;
    the half-duplex radio including a wireless transmitter and a wireless receiver;

a signal processor operatively coupled to the wireless transmitter and the wireless receiver, the signal processor being structured to execute an operating logic to communicate information in a data packet in accordance with a pattern unique to the device relative to the other devices; and where the data packet is partitioned into a data transmission slot and a data reception slot, the operating logic being structured to transmit the information during the transmission slot of the data packet and listen for information during the reception slot of the data packet, where data transmission slot for a unique pattern overlaps with data transmission slot from another unique pattern.

17. The wireless communication device of claim 16, where the data packet includes an error control code.

18. The device of claim 17, where the error control code provides for recovering the information despite erasures due to transmission overlap.

19. The device of claim 16, where the data transmission slot and the data reception slot provide full-duplex transmission using the half-duplex radio.

20. The device of claim 16, where the communication device and the one or more other devices simultaneously transmit data packets.

* * * * *